United States Patent [19]

Cody et al.

[11] Patent Number: 4,894,182

[45] Date of Patent: Jan. 16, 1990

[54] ORGANOPHILIC CLAY GELLANT AND PROCESSES FOR PREPARING ORGANOPHILIC CLAY GELLANTS

[75] Inventors: Charles A. Cody, Robbinsville; Steven J. Kemnetz, Trenton, both of N.J.

[73] Assignee: NL Chemicals, Inc., Hightstown, N.J.

[21] Appl. No.: 109,393

[22] Filed: Oct. 19, 1987

[51] Int. Cl.$^4$ .................. B01J 13/00; C08K 9/04; C08L 67/00

[52] U.S. Cl. ................ 252/315.2; 106/287.25; 106/287.3; 106/287.32; 106/287.29; 252/315.1

[58] Field of Search ..................... 252/315.2

[56] References Cited

U.S. PATENT DOCUMENTS

| | | | |
|---|---|---|---|
| 4,105,578 | 8/1978 | Finlayson et al. | 252/315.2 |
| 4,208,218 | 6/1980 | Finlayson | 252/315.2 X |
| 4,287,086 | 9/1981 | Finlayson et al. | 252/315.2 |
| 4,382,868 | 5/1983 | House | 252/315.2 X |
| 4,412,018 | 10/1983 | Finlayson et al. | 252/315.2 X |
| 4,425,244 | 1/1984 | House | 252/315.2 X |
| 4,434,075 | 2/1984 | Mardis et al. | 252/315.2 |
| 4,434,076 | 2/1984 | Mardis et al. | 252/315.2 |
| 4,450,095 | 5/1984 | Finlayson | 252/315.2 |
| 4,464,274 | 8/1984 | House | 252/315.2 X |
| 4,517,112 | 5/1985 | Mardis et al. | 2522/315.2 |

*Primary Examiner*—Brooks H. Hunt
*Assistant Examiner*—Virginia B. Caress
*Attorney, Agent, or Firm*—Burns, Doane, Swecker & Mathis

[57] ABSTRACT

An improved organophillic clay gellant which is the reaction product of a smectite-type clay, an organic cation and, optionally, an organic anion. The cation from the smectite-type clay, the anion from the organic cation and, if present, the cation from the organic anion form a by-product which is water, a gas, an insoluble compound or a mixture thereof. The organophilic clay gellant can exhibit improved efficiency and dispersibility. In a process for preparing an organophilic clay gellant which constitutes a further aspect of the present invention, significant advantages can be observed since the liquid remaining after the organophilic clay gellant is separated from the reaction mixture can be recycled for further use without detrimental effect on the quality of the organophilic clay gellant thereafter produced.

32 Claims, No Drawings

ORGANOPHILIC CLAY GELLANT AND PROCESSES FOR PREPARING ORGANOPHILIC CLAY GELLANTS

BACKGROUND OF THE INVENTION

1. Field of the Invention

The present invention relates to an improved organophilic clay gellant and processes for preparing organophilic gellants. The organophilic clay gellants of the present invention may be used to thicken a variety of organic compositions such as polyester compositions.

2. Description of the Prior Art

The preparation of organophilic clay gellants is well documented in the art. The gellants have been prepared from a variety of compounds, such as certain amines, but has more typically been prepared from "onium" compounds, most notably ammonium, phosphonium and sulfonium, with ammonium compounds being the most widely used. Exemplary descriptions of long known techniques for preparing organophilic clay gellants are set forth in U.S. Pat. Nos. 2,531,427, 2,859,234 and 2,966,506.

In the evolution of organophilic clay gellants, certain organic cations or organic cations and organic anions have been developed which impart improved characteristics to the organophilic clay gellants. For example, the ease of dispersion and/or efficiency of the organophilic clay gellants may be significantly improved by using certain organic cations or combinations of organic cations with organic anions. Illustrative patents which describe such improved organophilic clay gellants are U.S. Pat. Nos. 4,105,578, 4,208,218, 4,287,086, 4,391,637, 4,410,364, 4,412,018, 4,434,075, 4,434,076, 4,450,095 and 4,517,112.

The basic process for preparing the organophilic clay gellants has remained fairly standard. In particular, the clay is treated so as to place inorganic cations, such as potassium, magnesium and most preferably, sodium, on the exchange sites. There is some indication in the art, such as in British Pat. No. 1,106,281, that the presence of the sodium ions is important to achieve swelling of the clay. An aqueous slurry of the clay is then heated and reacted with an organic cation which is originally associated with an anion which can be an acetate (see U.S. Pat. No. 2,704,276) or hydroxyl (see U.S. Pat. No. 2,879,229) or possibly some organic anion (see U.S. Pat. No. 4,317,737), but is typically chloride as can be seen from the U.S. Patents mentioned above. If an organic anion is also used to prepare the organophilic clay gellant, it is typically prepared in the form of an acid or salt.

The reaction product (i.e., the organophilic clay gellant) of the cation exchanged clay and the organic cation and, if present, the organic anion is separated from the slurry, washed and dried and the residual liquid is discarded.

While certain improvements in the organophilic clay gellant have been obtained by subjecting a slurry of the clay to high shear conditions prior to reaction with the organic cation, using dilute reaction conditions when the clay is reacted with the organic cation and, if present, the organic anion and employing gentle drying of the organophilic clay gellant, as disclosed in commonly assigned U.S. application Ser. No. 767,599, filed on Aug. 20, 1985, now U.S. Pat. No. 4,695,402, it is desirable to achieve further improvements in organophilic clay gellants and the processes for preparing them.

OBJECTS AND SUMMARY OF THE INVENTION

Accordingly, it is a general object of the present invention to provide an improved organophilic clay gellant and improved processes for preparing organophilic clay gellants.

It is a more specific object of the present invention to provide an organophilic clay gellant with improved efficiency in thickening organic compositions.

It is an additional object of the present invention to provide an organophilic clay gellant which exhibits improved dispersion in organic compositions.

It is a further object of the present invention to provide a process for preparing an organophilic clay gellant which makes efficient use of the reaction constituents and reduces energy requirements thereby improving the economics of the process.

It is a still further object of the present invention to provide a process for preparing an organophilic clay gellant wherein the liquid remaining after the organophilic clay gellant is recovered and is then reused to prepare additional organophilic clay gellant.

It is a yet further object of the present invention to provide a process for preparing an organophilic clay gellant wherein the organophilic clay gellant is dried in the substantial absence of washing.

In one aspect, the present invention provides an improved organophilic clay gellant which comprises the reaction product of a smectite-type clay having a cation exchange capacity of at least about 75 milliequivalents per 100 grams of said clay and an organic cation compound having the general formula:

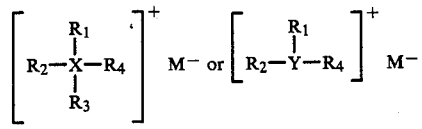

or mixtures thereof wherein X is a nitrogen or phosphorus, Y is sulfur, $R_1$ is a lineal or branched, saturated or unsaturated alkyl group having 12 to 22 carbon atoms and $R_2$, $R_3$ and $R_4$ are independently selected from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups including phenyl and substituted phenyl including fused ring aromatic substituents; (d) beta, gamma, unsaturated groups having six or less carbon atoms or hydroxyalkyl groups having 2 to 6 carbon atoms; and (e) hydrogen and wherein the reaction product of the cation from the smectite-type clay and $M^-$ is water, a gas, an insoluble compound or a mixture thereof.

In another aspect, the present invention provides a process for preparing the organophilic clay gellant which comprises:

(a) preparing a slurry of a smectite-type clay having a cation exchange capacity of at least 75 milliequivalents per 100 grams of clay; and (b) reacting the smectite-type clay with organic cation in an amount ranging from about 90 to about 150 percent of the cation exchange capacity of the clay, said organic cation having the general formula:

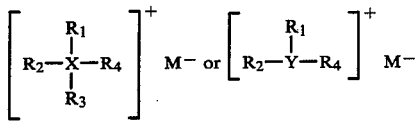

or mixtures thereof wherein X is a nitrogen or phosphorus, Y is sulfur, $R_1$ is a lineal or branched, saturated, or unsaturated alkyl group having 12 to 22 carbon atoms and $R_2$, $R_3$ or $R_4$ are independently selected from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups including phenyl and substituted phenyl including fused ring aromatic substituents; (d) beta, gamma, unsaturated groups having six or less carbon atoms or hydroxylalkyl groups having 2 to 6 carbon atoms; and (e) hydrogen and wherein the reaction product of the cation from the smectite-type clay and $M^-$ is water, a gas, an insoluble compound or a mixture thereof.

In a further aspect, the present invention provides a process for preparing an organophilic clay gellant which comprises:

(a) preparing a slurry of a smectite-type clay having a cation exchange capacity of at least 75 milliequivalents per 100 grams of clay;

(b) reacting the smectite-type clay with organic cation in an amount ranging from about 90 to about 150 percent of the cation exchange capacity of the clay whereby at least some of the cation exchange sites of the smectite-type clay are substituted with organic cation thereby forming an organophilic clay gellant;

(c) separating the organophilic clay gellant from the slurry thereby forming a liquid;

(d) passing the liquid through at least one of a cation exchange resin in hydrogen form and an anion exchange resin in hydroxyl form; and (e) recycling the liquid for use in the preparation of further smectite-type clay slurry.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to an improved organophilic clay gellant. The organophilic clay gellant is a reaction product of smectite-type clay and an organic cation with the cation originally present on the smectite-type clay and the anion originally associated with the organic cation also reacting to form water, a gas, an insoluble compound or a mixture thereof.

The clay which is used in the present invention is a smectite-type clay having a cationic exchange capacity of at least about 75 milliequivalents per 100 grams of clay as determined by the well known ammonium acetate method. The smectite-type clays are well known in the art and are available from a variety of sources. The clays are treated to place the appropriate cation or mixtures of cations onto the clay. This can conveniently be done by preparing an aqueous clay slurry and passing the slurry through a bed of cation exchange resin in the appropriate form. For example, if the reaction product of the cation from the smectite-type clay and the anion from the organic cation is water, the cation exchange resin is treated with an acid, such as hydrochloric acid, sulfuric acid, acetic acid, phosphoric acid or perchloric acid, to place the cation exchange resin in the hydrogen form. Thereafter, an aqueous slurry of the smectite-type clay is passed through the cation exchange resin in order to form the smectite-type clay in the hydrogen form (i.e., having hydrogen ions on exchange sites of the clay).

On the other hand, if the reaction product is a gas or an insoluble compound, other cations which can be exchanged onto the smectite-type clay can be organic cations, such as derived from ethanolamine, diethanolamine, triethanolamine, methyldiethanolamine, butyldiethanolamine, diethylamine, dimethylamine, triethylamine, dibutylamine, and so forth, i.e., ammonium compounds, and various sulfonium and phosphonium compounds, and mixtures thereof or inorganic cations such as derived from magnesium, calcium, barium, silver, lead, bismuth, mercury, strontium, cobalt, iron, manganese, tin, zinc and mixtures thereof. Preferred cations are magnesium, calcium, barium and mixtures thereof. Of course, the selection of the particular cation depends on the anion derived from the organic cation.

The cation exchange resin which can be used to achieve conversion of the smectite-type clay is any of those well known in the art which can achieve the desired result. Illustrative cation exchange resins are Amberlite 200 available from Rohm & Haas Co., Dowex 50 available from Dow Chemical Co. or Duolite CS-101 available from Chemical Process Co.

Other procedures can also be used to prepare the smectite-type clay. For example, a methathesis reaction can be used to place the appropriate cation on the smectite-type clay.

Representative of smectite-type clays useful in the present invention are the following:

Montmorillonite
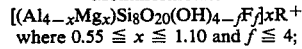
where $0.55 \leq x \leq 1.10$ and $f \leq 4$;

Bentonite
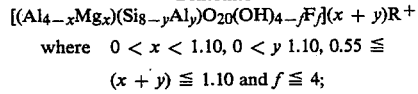
where $0 < x < 1.10$, $0 < y\ 1.10$, $0.55 \leq (x + y) \leq 1.10$ and $f \leq 4$;

Biedellite
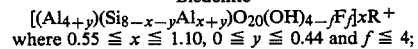
where $0.55 \leq x \leq 1.10$, $0 \leq y \leq 0.44$ and $f \leq 4$;

Hectorite
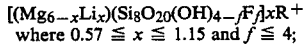
where $0.57 \leq x \leq 1.15$ and $f \leq 4$;

Saponite
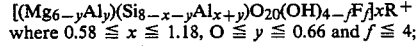
where $0.58 \leq x \leq 1.18$, $O \leq y \leq 0.66$ and $f \leq 4$;

Stevensite
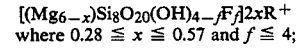
where $0.28 \leq x \leq 0.57$ and $f \leq 4$;

In the foregoing formulae, $R^+$ is an exchangeable cation. Of course, it may not be possible to convert all of the exchangeable cation to that which is desired.

However, the clay should be treated so that the advantageous results mentioned herein may be obtained.

The preferred clays used in the present invention are bentonite and hectorite.

Smectite-type clays prepared synthetically by either a pneumatolytic or, preferably, a hydrothermal synthesis process can also be used. The clays may be synthesized hydrothermally by forming an aqueous reaction mixture in the form of a slurry containing mixed hydrous oxides or hydroxides of the desired metals with or without, as the case may be, the appropriate exchangeable cation or mixture thereof in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending on the particular smectite-type clay being synthesized and the optimum time can readily be determined by pilot trials.

Representative hydrothermal processes for preparing synthetic smectite clays are described in U.S. Pat. Nos. 3,252,757, 3,586,478, 3,666,407, 3,671,190, 3,844,978, 3,844,979, 3,852,405 and 3,855,147, all of which are herein incorporated by reference.

The organic cation which is reacted with the smectite-type clay must have a positive charge localized on a single atom or on a small group of atoms within the compound. The organic cation is preferably an ammonium cation which contains at least one lineal or branched, saturated or unsaturated alkyl group having 12 to 22 carbon atoms. The remaining groups of the cation are chosen form (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups including phenyl and substituted phenyl including fused ring aromatic substituents; (d) beta, gamma, unsaturated groups having six or less carbon atoms or hydroxyalkyl groups having two to six carbon atoms; and (e) hydrogen.

The long chain alkyl radicals may be derived form naturally occurring oils including various vegetable oils, such as corn oil, coconut oil, soybean oil, cotton seed oil, castor oil and the like, as well as various animal oils or fats such as tallow oil. The alkyl radicals may likewise be petrochemically derived such as from alpha olefins.

Representative examples of useful branched, saturated radicals including 12-methylstearyl; and 12-ethylstearyl. Representative examples of useful branched, unsaturated radicals include 12-methyloleyl and 13-ethyloleyl. Representative examples of unbranched saturated radicals include lauryl; stearyl; tridecyl; myristyl (tetradecyl); pentadecyl; hexadecyl; hydrogenated tallow; and docosanyl. Representative examples of unbranched, unsaturated and unsubstituted radicals include oleyl, linoleyl, linolenyl, soya and tallow.

Additional examples of aralkyl, that is benzyl and substituted benzyl moieties would include those materials derived from e.g., benzyl halides, benzhydryl halides, trityl halides, α-halo-α- phenylalkanes wherein the ally chain has from 1 to 22 carbon atoms, such as 1-halo-1-phenylethane, 1-halo-1-phenyl propane, and 1-halo-1-phenyloctadecane; substituted benzyl moieties, such as would be derived from ortho, meta and para-chlorobenzyl halides, para-methoxybenzyl halides, ortho, meta and para-nitrilobenzyl halides, and orth, meta and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophilic replaces the leaving group on the benzyl type moiety.

Examples of aryl groups would include phenyl such as in N-alkyl and N,N-dialkyl anilines, wherein the alkyl groups contain between 1 and 22 carbon atoms; ortho, meta and paranitrophenyl, ortho, metal and para-alkyl phenyl, wherein the alkyl group contains between 1 and 22 carbon atoms, 2-, 3-, and 4-halophenyl wherein the halo groups is defined as chloro, bromo, or iodo, and 2-, 3- and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenarthene.

The $\beta,\gamma$- unsaturated alkyl group may be selected form a wide range of materials. These compounds may be cyclic or acyclic, unsubstituted or substituted with aliphatic radicals containing up to 3 carbon atoms such that the total number of aliphatic carbons in the $\beta,\gamma$-unsaturated radical is 6 or less. The $\beta,\gamma$-unsaturated alkyl radical may be substituted with an aromatic ring that likewise is conjugated with the unsaturation of the $\beta, \gamma$ moiety or the $\beta,\gamma$-radical is substituted with both aliphatic radicals and aromatic rings.

Representative examples of cyclic $\beta,\gamma$-unsaturated alkyl groups include 2-cyclohexenyl and 2-cyclopentenyl. Representative examples of acyclic $\beta,\gamma$-unsaturated alkyl groups containing 6 or less carbon atoms include propargyl; allyl(2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2-propenyl); 2-phenyl-2-propenyl; and 3-(4 methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxy is not substituted at the carbon adjacent to the positively charged atom, and the group has from 2 to 6 aliphatic carbons. The alkyl group may be substituted with an aromatic ring independently from the 2 to 6 aliphatic carbons. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycylohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2- hydroxypropyl; 2-phenyl-2-hydroxyethyl; 3-methyl-2-hydroxybutyl; and 5-hydroxy-2-pentenyl.

The organic cation can thus be considered as having at least one of the following formulae:

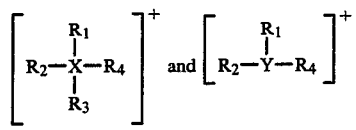

wherein X is nitrogen or phosphorus, Y is sulfur, $R_1$ is the long chain alkyl group and $R_2$, $R_3$ and $R_4$ are representative of the other possible groups described above. Preferably, the organic cation is at least one of ammonium and phosphonium and most preferably it is ammonium.

A preferred organic cation contains at least one lineal or branched, saturated or unsaturated alkyl group having 12 to 22 carbon atoms, at least one lineal or branched, saturated or unsaturated alkyl group having 1 to 12 carbon atoms and at least one aralkyl group having lineal or branched, saturated or unsaturated alkyl group having 1 to 12 carbons in the alkyl portion.

Especially preferred organic cations are ammonium cations where $R_1$ is hydrogenated tallow, $R_2$ is benzyl and $R_3$ and $R_4$ are methyl or wherein $R_1$ and $R_2$ are hydrogenated tallow and $R_3$ and $R_4$ are methyl or where $R_1$ and $R_2$ are hydrogenated tallow, $R_3$ is methyl and $R_4$ is benzyl or mixtures thereof.

The amount of organic cation reacted with the smectite-type clay depends upon the specific clay and the desired degree of hydrophobicity. Typically, the amount of cation ranges from about 90 to about 150%, preferably from about 100 to about 130% of the cation exchange capacity of the clay on a 100% active basis. Thus, for example, when bentonite (i.e., of about 95 milliequivalents per 100 grams of clay, 100% active basis) is used, the amount of cation reacted with the clay will range from about 85 to about 143 milliequivalent, preferably from about 95 to about 124 milliequivalents per 100 grams of clay, 100% active basis.

The anion which accompanies the organic cation (designated as $M^-$) is selected depending on the desired reaction product of it with the cation from the smectite-type clay. For example, if the desired reaction product is water, then the anion will be hydroxyl. Alternatively, if the desired reaction product is a gas or an insoluble compound then the appropriate anion will be used. Besides hydroxyl, exemplary inorganic anions are carbonate, bicarbonate, sulfate, phosphate, phosphite, oxalate, formate, chromate, stearate and mixtures thereof, while exemplary organic anions are stearate, carboxylate, organic sulfate, organic sulfonate, organic phosphate, organic phosphite, organic carbonate, organic bicarbonate, and mixtures thereof. It is preferred that the amount of the desired anion (i.e., that which will form water, gas or insoluble compound) present will be in a stoichiometric ratio with the amount of organic cation. However, small amounts of anions forming soluble compounds may be present as long as the amount does not substantially adversely affect the advantageous results which can be obtained.

The preparation of the organic cationic compound (i.e., the organic cation paired with the anion) can be achieved by techniques well known in the art. For example, when preparing a quaternary ammonium salt, one skilled in the art would prepare a dialkyl secondary amine, for example, by the hydrogenation of nitriles, see U.S. Pat. No. 2,355,356, and then form the methyl dialkyl tertiary amine by reductive alkylation using formaldehyde as a source of the methyl radical. According to the basic procedures set forth in U.S. Pat. No. 3,136,819 and U.S. Pat. No. 2,775,617, quaternary amine compound may then be formed by adding the appropriate benzyl compound (instead of a benzyl halide) to the tertiary amine.

In the event that the organic cation is in the form which is not desired (e.g., having chloride as the associated anion), as may be the case with commercially available material, the organic cation-containing compound can be treated, such as by a metathesis reaction or by passing a solution containing the organic cation through an anion exchange resin which has been converted to the appropriate form. Such anion exchange resins are conventional in the art, are available commercially and are exemplified by Amberlite IRA-400, available from Rohm & Haas Co., Dowex, available from Dow Chemical Co. and Duolite A-101, available from Chemical Process Co.

Illustrative of the numerous patents which describe organic cationic compounds, particulary salts, their manner of preparation and their use in the preparation of organophilic clays are commonly assigned United States Pat. Nos. 2,966,506, 4,081,496, 4,105,578, 4,116,866, 4,208,218, 4,391,637, 4,410,364, 4,412,018, 4,434,075, 4,434,076, 4,450,095 and 4,517,112, the contents of which are incorporated by reference.

The organophilic clay gellant of the present invention may also be the reaction product of the smectite-type clay, an organic cation and an organic anion. The organic anion is selected from a wide range of materials which are capable of reacting with the organic cation in order to form an organic cation/organic anion complex which may be intercalated with the smectite-type clay. The molecular weight (gram molecular weight) of the organic anion is preferably 3,000 or less, and most preferably 1,000 or less and contains at least one acidic moiety per molecule so as to permit the formation of the organic cation/organic anion complex. The organic anion is preferably derived from an organic compound having a $pK_A$ less than about 11.0.

Preferable organic anions are derived from carboxylic acids, such as stearic acid, sulfonic acids and alkyl sulfates, such as the lauryl half ester of sulfuric acid, with an especially preferred anion being stearate particularly wherein the organophilic clay gellant is designed for thickening a polyester composition.

If the organic anion, which includes mixtures of organic anions, is reacted simultaneously with the organic cation and smectite-type clay to form the organophilic clay, the organic anion should be added to the reaction mixture in acid form if water is the desired by-product or combined with a cation which will yield a gas, an insoluble compound or a mixture thereof in the reaction mixture. In this way, the formed organophilic clay gellant has the improved characteristics and the remaining liquid can be recycled.

Exemplary cations which may be originally associated with the organic anion include those derived from hydrogen, magnesium, calcium, barium, as well as the other cations mentioned with respect to the cation associated with the smectite-type clay, and organic cations such as those derived from ethanolamine, diethanolamine, triethanolamine, methyldiethanolamine, butyldiethanolamines, diethylamine, dimethylamine, triethylamines, dibutylamine, and so forth, i.e., ammonium compounds, and various sulfonium and phosphonium compounds, an mixtures thereof.

On the other hand, if the organic anion is added after the organic cation has been reacted with the smectite-type clay (with the by-product thereof being water, a gas, an insoluble compound or a mixture thereof), the cation associated with the organic anion can yield an electrolyte without substantially adversely affecting the characteristics of the organophilic clay gellant. However, the resulting liquid cannot be recycled indefinitely without further treatment. Thus, it is preferred that the organic anion is in acid form or combined with a cation which will yield water, a gas, an insoluble compound or a mixture thereof so that the residual liquid can be recycled in the manner discussed below.

The amount of organic anion reacted with smectite-type clay and the organic cation is sufficient to obtain a milliequivalent ratio of organic cation to organic anion in the range of from about 1.7 : 1.0 to about 28 : 1.0, preferably from about 3.0 : 1.0 to about 12 : 1.0. Of course, the most preferred ranges depend on the particular organic cation and organic anion and the intended environment of use and ca be determined by experimentation guided by the information set forth above. A most preferred range for organophilic clay gellants of the present invention designed for polyester compositions have an organic cation to organic anion ratio in the range of from about 4.0 : 1.0 to about 6.0 : 1.0. To illustrate the foregoing general principle, wherein the smectite-type clay is bentonite and the amount of organic cation is 102 milliequivalents, from about 5 to about 50 milliequivalents, preferably from about 10 to about 30 milliequivalents of anion, such as stearate, per 100 grams of clay, 100% active basis, is reacted with the clay and the organic anion.

Illustrative patents which describe suitable organic anions which may be co-reacted with the organic cation and the smectite-type clay in order to form the organophilic clay include commonly assigned U.S. Pat. Nos. 4,412,018, 4,343,075 and 4,517,112, the contents of all of which are incorporated by reference.

To illustrate this aspect of the invention further, if water is the desired by-product of the reaction in which the organophilic clay is formed, then the smectite-type clay will be converted to the hydrogen form and the organic cation that is to be reacted with the smectite-type clay will originally have hydroxyl associated therewith. If an organic anion also participates in the formation of the organophilic clay, the cation originally associated with the organic anion should preferably also be hydrogen so that it too will form water as the by-product.

If a gas is the desired by-product of the reaction, the cation(s) and anion(s) will likewise be selected to give the particular reaction by-product. For example, if the gas is carbon dioxide, the cation from the smectite-type clay and from the organic anion, if present, will be hydrogen and the anion from the organic cation will be carbonate.

Other gases can likewise be formed which do not substantially adversely affect the organophilic clay and are substantially innocuous to both the equipment and the individuals utilizing such equipment. The most preferred gas is carbon dioxide.

If an insoluble compounds is desired, the cation(s) and anion(s) are selected so as to obtain a compound or compounds which will be insoluble in the reaction mixture. As used herein, the term "insoluble" encompasses those compounds which have a solubility constant of $1 \times 10^{-2}$ or less in water at room temperature. For example, if the reaction medium principally contains water, the cation and anion can be selected to form barium sulfate, calcium sulfate, lead sulfate, silver sulfate, calcium phosphite, calcium phosphate, lead phosphate, magnesium carbonate, barium carbonate, calcium carbonate, barium fluoride, calcium fluoride, various insoluble organic compounds and mixtures thereof. Preferred insoluble compounds include barium sulfate, calcium sulfate, calcium phosphite, calcium phosphate, lead phosphate, magnesium carbonate, calcium carbonate, barium carbonate, barium fluoride, calcium fluoride and mixtures thereof.

Other reaction media can likewise be used such as a lower alcohol, exemplified by methanol, ethanol, propanol or butanol, dimethylsulfide, glycols or other substances in which the clay can be dispersed. Mixtures of reaction media can also be used.

The selection of the appropriate cation and anion to form the insoluble compound can also be undertaken with a further goal being to improve the properties of the organophilic clay gellant. That is, since the insoluble compound will be recovered with the organophilic clay gellant, an insoluble compound can be formed which imparts certain additional characteristics to the gellant. For instance, the formation of barium sulfate functions as a filler and a pigment, while the formation of calcium phosphite serves to improve corrosion resistance. Other insoluble compounds which may be formed as the by-product and which can serve a useful function include calcium sulfate, calcium carbonate, barium carbonate and mixtures thereof.

As stated above, mixtures of water, gas and insoluble compound can be obtained as the by-product during the preparation of the organophilic clay gellant. Thus, for example, if the smectite-type clay is converted to the hydrogen form and the anion from organic cation is a mixture of hydroxyl and carbonate, then both water and carbon dioxide will be obtained as the by-product. Other mixtures which constitute the by-product will be apparent to those of ordinary skill in the art based on the full appreciation of the present invention.

The organophilic clay gellants of the present invention exhibit improved results over similar gellants conventionally prepared in the presence of electrolytes, such as sodium chloride. The organophilic clay gellants of the present invention can achieve a higher level or dispersibility and efficiency when used to thicken organic compositions, such as polyester and grease compositions. Additionally, the organophilic clay gellants may have a reduced corrosive effect on metal which are often exposed to the organic compositions thickened by the organophilic clay gellants.

A further aspect of the present invention is a process for preparing an organophilic clay. The process involves preparing a slurry of a smectite-type clay having a cation exchange capacity of at least 75 milliequivalents per 100 grams of clay and reacting the smectite-type clay with the aforementioned organic cation and, if present, the organic anion wherein the reaction product of the cation from the smectite-type clay, the anion from the organic cation and, if present, the cation from the organic anion form water, a gas, an insoluble compound or mixture thereof.

Preparation of the slurry may be in accordance with conventional techniques. For instance, the smectite-type clay can be dispersed in an aqueous medium in an amount ranging from about 5 to about 20 percent by weight, preferably from about 1 to about 5 percent by weight. Alternatively, the smectite-type clay can be dispersed in a water miscible alcohol, such as at least one of methanol, ethanol, propanol and butanol, or in some instances an organic medium such as at least one of dimethylsulfoxide and glycols with the smectite-type clay being present in the amounts mentioned.

In the event that the smectite-type clay has not been previously placed in the desired form, it may be done so by passing the slurry through a cation exchange resin which has been converted to the appropriate form. Either before or after this step, the slurry of the smectite-type clay is heated to a temperature of from about 20° to about 100° C., preferably from 45° to about 75° C.

Other techniques can likewise be used to place the smectite-type clay in the desired form so that water, gas or an insoluble compound will be obtained upon formation of the organophilic clay gellant.

The heated slurry of the smectite-type clay is then reacted with the organic cation and, if present, the organic anion of the types previously described, generally under agitation. The organic cation and organic anion can be added separately or in combination and may be added neat or dispersed in water or water mixed with miscible organic solvent such as methanol, ethanol and preferably isopropyl alcohol. Such organic solvents are used with water to solubilize the organic material. It has been observed that an amount of the organic solvent in an amount of at least about 0. percent by weight of the total reaction slurry yields an increases in the viscosity performance of the organophilic clay gellant.

The reaction mixture is maintained within the temperature range previously stated for a time sufficient to permit exchange of organic cation and, if present, organic anion and to permit the formation of the by-product whether it be water, a gas, an insoluble compound or a mixture thereof.

The reaction product which principally comprises the organophilic clay gellant and any insoluble compound formed as by-product is then separated from the reaction medium, such as by a filtration step. Since the organophilic clay gellant has been prepared in the substantial absence of electrolytes, such as sodium chloride or other salts, the organophilic clay gellant does not have to be extensively washed, such as by repulping and refiltering, as was typically done in the past. Instead, the organophilic clay gellant may thereafter be dried or may be used without drying in an appropriate organic composition.

After the organophilic clay gellant is dried, it is typically ground using a hammer mill or similar grinding apparatus to break apart the agglomerates. The ground organophilic clay gellant generally has a particle size in the range of from about 0.1 to about 500 microns, preferably from about 1 to about 150 microns. Naturally, the desired size of the organophilic clay gellant particles is dictated by the environment of use.

In the past, the liquid remaining after the organophilic clay gellant has been separated from the reaction medium has been discarded. This resulted in the loss of the liquid which would be particularly significant if an organic solvent was employed to disperse the smectite-type clay and/or the organic cation and/or, if present, the organic anion. Additionally, the energy expended in heating the slurry would be lost and, possibly in some locales, the liquid might have to be treated to comply with local environmental regulations. If the liquid from the preparation of organophilic gellants made by conventional techniques was reused to prepare additional smectite-type clay slurry, the presence of the electrolytes would significantly degrade the quality of the organophilic clay and would tend to cause undesirable agglomeration of the clay particles before the clay was reacted to form the organophilic clay gellant and the formed organophilic clay would require more extensive washing upon recovery. Furthermore, these disadvantages would be exacerbated each time the liquid was reused since the concentration of the electrolyte would increase with every cycle until a steady state was reached.

The previously discussed process aspect of the present invention substantially alleviates the problems of conventional processes for preparing organophilic clay gellants. All or a portion of the liquid remaining after the organophilic clay gellant is recovered can be directly recycled in order to prepare further slurry of the smectite-type clay and/or to be mixed with the organic cation and, if present, the organic anion. This means that the need for further liquid to prepare new slurry and/or further mixtures of the organic cation and organic anion can be significantly reduced. Of course, a small amount of make-up liquid will probably be necessary due to the loss incurred from evaporation and the presence of the liquid in the recovered organophilic clay gellant. Furthermore, energy requirements can be reduced since the recycled liquid is at an elevated temperature and environmental considerations can be lessened. Yet further, to the extent that an organic solvent is employed, it can economically be used at a concentration so as to give improved viscosity performance.

In a further aspect of the present invention, a process has been developed which can be used to modify and improve existing conventional processes for preparing organophilic clay gellants. As pointed out above, organophilic clay gellants are conventionally prepared so as to yield an electrolyte, most typically a salt, such as sodium chloride, as a by-product in the liquid. This aspect of the present invention substantially alleviates this problem by treating the liquid so as decrease the amount of electrolyte in the liquid. However, since the organophilic clay gellant is still prepared in the presence of the electrolyte, the improvements in the performance noted above with the first aspect of the invention are generally not achieved.

The treatment of the liquid is preferably conducted using at least one of a cation exchange resin in hydrogen form and an anion exchange resin in hydroxyl form. In the event that the organophilic clay is prepared using an organic cation which is originally associated with a hydroxyl group, but the smectite-type clay has electrolyte forming cations (e.g., sodium ions) associated therewith, the liquid would have to be treated with only the cation exchange resin before being reused. Conversely, if the anion originally associated with the organic cation is electrolyte forming (e.g., chloride), but the smectite-type clay is in hydrogen form, then the resulting liquid would only have to pass through the anion exchange resin. More typically, sodium would result from the smectite-type clay and chloride would result from the organic cation and the liquid would be treated with both cation and anion exchange resins.

Other procedures can be used in order to treat the liquid and reduce the level of electrolyte therein. For example, the liquid can be treated by dialysis or by precipitation with removal of the precipitate. In any event, the treatment of the liquid should be selected so as to reduce the amount of soluble electrolyte formed from the preparation of the organophilic clay gellant by at least 75%, preferably by at least 85% and most preferably by at least 95%, all percentages being on a weight basis.

It is believed that further improvements may be achieved by using one or more of the process parameters described in aforementioned copending commonly assigned application Ser. No. 767,599, the contents of which are incorporated by reference. As explained in greater detail in the application, it has been found that with a given organic cation and, if present, a given organic anion (which of course includes mixtures of cations and/or anions as indicated previously), there are three process parameters which contribute to the improved results obtained by the organophilic clay gellant of the present invention. The three process parameters are (1) shearing of the smectite-type clay prior to reaction with the organic cation and, if present, the organic anion; (2) using dilute reaction slurry conditions; and (3) gentle drying of the organophilic clay product.

Although all three of these parameters contributes to the advantageous results, the importance of the individual parameter will vary according to the composition of the organophilic clay gellant. Thus, for example, the gentle drying condition helps preserve and enhance the results obtained by shearing and/or dilution for certain organophilic clay gellants designed for polyester compositions. Therefore, in these instances, the organophilic clay gellant is preferably prepared by using shearing and/or dilution coupled with the gentle drying step. Of course, the most preferred organophilic clay gellant is prepared by using the combination of the three parameters.

The organophilic clay gellants of the present invention can be used to efficiently and effectively increase the viscosity of various organic compositions. Depending in large part on the composition, the organophilic clay gellant can be used in a conventional manner to thicken organic compositions exemplified by lubricating greases, oil base muds, oil base packer fluids, paint-varnish-lacquer removers, paints, cosmetic foundations, foundary molding, sand binders, adhesives, sealants, and inks. As can be understood, the organophilic clay gellant is selected such that it is effective in the particular organic composition. For example, bentonite or hectorite clay can be reacted with dimethyl dihydrogenated tallow ammonium cation to produce a gellant well suited for thickening lubricating greases. Other specific gellants may be ascertained from the above-identified commonly assigned U.S. patents which have been incorporated by reference and the Examples set forth below.

Certain organophilic clay gellants made in accordance with the present invention are particularly useful in thickening unsaturated polyester compositions based on unsaturated acids or acid anhydrides and diols in admixture with unsaturated aromatic peroxides, the polyesters become cross-linked. The polyester compositions, when cross-linked, can be used to produce coatings or glass fiber-reinforced laminates by methods well known in the art. In the preparation of glass fiber-reinforced laminates of these cross-linked polymers, thixotropic gelling agents are employed which decrease the viscosity of the uncross-linked polyester at high shear, such as is developed in mixing and spraying, but which increase their viscosity at low or no shear to prevent drainage of the composition along the vertical surfaces to which they are applied.

Unsaturated polyesters useful in preparing the thixotropic compositions are polyesters of a dicarboxylic acid and a diol having a major amount of olefinic unsaturation, preferably 0 to 75 olefin groups per 100 ester groups. The olefinic unsaturation is preferably derived from the carboxylic acid although the diol may be unsaturated. Typical diols are ethylene glycol and propylene glycol. Typical unsaturated acids include maleic acid, fumaric acid as well as anhydrides of these acids. Such polyesters are made by conventional techniques of esterification as is well known in the art. Generally, polyesters having molecular weights of from about 400 to 10,000 and acid numbers in the range of from 35 to 45 KOH per gram of resin are useful for preparing thixotropic polyester compositions. Additionally, dicyclopentadiene and/or isophtholic acid based polyester resins may also be used.

The unsaturated aromatic monomers are aromatic compounds to which is bonded one or more ethylenically unsaturated groups such as a vinyl group, substituted vinyl group or an allylic group. Suitable monomers include styrene, $\alpha$-methyl styrene, divinyl benzene, and allyl benzene. Styrene is preferred due to its effectiveness, wide use and availability. Such monomers are used in cross-linking the polyesters and also act as diluents to reduce viscosity.

In a typical procedure for preparing unsaturated polyester compositions, the liquid unsaturated polyester resin is mixed in a conventional apparatus with unsaturated aromatic monomer to prepare a solution having a solids content between about 40 and 95% by weight polyester. Additional descriptions of polyester compositions exist in U.S. Pat. Nos. 3,974,123, 4,216,135 and 4,240,951, the contents of which are incorporated by reference.

The organophilic clay gellants can then be added to the liquid laminating resin and mixed in under low shear conditions to form a homogeneous mixture. That is, the gellant can be directly added to the polyester composition without the necessity of forming the pregel required in the past. However, by forming a pregel by gentle mixing (e.g., by using a Lightnin mixer) of the aromatic monomer with the organophilic clay gellant, higher efficiency of the gellant can be achieved. The amounts of organophilic clay gellant used in polyester compositions can range from 0.25% to 10%, preferably 0.5% to 4%. Amounts larger than 10% may be employed even though such levels are not economical and may form a resin system that is difficult to handle.

The following inventive and comparative examples are given to illustrate and contrast the present invention. However, the examples should not be construed as limiting the invention.

EXAMPLE 1

This example shows the effect of the presence of an electrolyte during the formation of an organophilic clay on gellant performance.

A beneficated bentonite clay (in sodium form) slurry having a solids content of 3.04% by weight that has been Manton Gaulin sheared at 5000 psi is pumped at 65.8 grs/min into a clay dilution reactor along with recycled filtrate from the filtrate holding tan which is pumped into the dilution reactor at 101.6 grs/min. For the initial start-up of this reaction, deionized water is used until all reactors are filled to capacity and filtrate can be collected and recycled. The clay dilution reactor is heated to 65° C. and when it is filled to capacity it overflows by gravity into a line that is "T"ed with the gravity overflow from the organic reactor.

The organic compounds used in the reaction are 106 milliequivalents of benzyl dimethyl hydrogenated tallow ammonium chloride, and 22.5 milliequivalents of sodium stearate (both amounts being per 100 grams of clay solids, 100% active basis) which are dissolved in water containing a small amount of isopropyl alcohol. This solution is made by pumping 1.12 gr/min of a mixture of the ammonium chloride compound and isopropyl alcohol (the mixture having an effective molecular weight of 537 grams) into the organic reactor along with a 15% solution of sodium stearate pumped at 0.90 grs/min. The 15% solution of sodium stearate is made by dissolving sodium stearate in a 75% $H_2O$/25% isopropyl alcohol solution heated to 75° C. to maintain a clear solution.

Recycled filtrate is pumped into the organic reactor from the filtrate holding tank at 30.6 g/min. The organic reactor is heated to 65° C. to form a clear solution which will gravity flow into a line "T"ed with the dilute clay line. The total charge of this reaction produces a final clay solids content of about 1.0% by weight.

The gravity overflow from both the dilute clay reactor and the organic reactor is fed into a first product reactor which will fill to capacity and overflow into a second product reactor. Both product reactors are maintained at 65° C. and with the combined pumping rates, the total average reaction time or dwell time in the two product reactors is about 30 minutes.

The gravity overflow from the second product reactor is fed to a Buchner funnel where the organophilic clay is collected and the filtrate from the second product reactor is pumped back to a filtrate holding tank. The pumping rate of the filtrate pump is adjusted to a rate which maintains a fixed filtrate level in the vacuum flask. The filtrate pump can deliver filtrate to the filtrate holding tank by two separate routes: (1) directly to the filtrate holding tank; and (2) through a universal ion exchange column then to the filtrate holding tank. The universal ion exchange column is used to remove both cations and anions from the filtrate.

The organophilic clay is prepared continuously for 10 hours by the above described procedure. During the first 8 hours of operation the filtrate pump delivers the filtrate directly to the filtrate holding tank. This would allow a build-up of sodium chloride in the recycled filtrate until an equilibrium is reached. For the last 2 hours of the run, the recycled filtrate is pumped through the ion exchange column to remove all cations and anions from the filtrate.

Samples are taken on an hourly basis throughout the run. The organophilic clay is collected for 10 minutes in the Buchner funnel at which time it is transferred to a 3 liter stainless steel reactor. The amount of solids collected over 10 minutes is repulped in 1.5 liters of tap water at 45° C. for 3 minutes. The repulped solids are filtered and then dried at 40° C. in a forced air oven. All samples are tested as "direct add" polyester additives in a standard Reichhold polyester resin described below.

Samples of the filtrate are also taken on an hourly basis throughout the run. These samples are taken at the filtrate pump discharge, but before the filtrate holding tank. The filtrate samples are analyzed for % $Cl^-$ which appears in Table I along with the resulting 6 rpm Brookfield viscosities of the standard polyester resin containing samples of the organophilic clay.

TABLE I

| Time (in hours) | Viscosity (in cP) | Percent $Cl^-$ Filtrate |
|---|---|---|
| 1 | 2160 | .074 |
| 2 | 2020 | .099 |
| 3 | 1920 | .115 |
| 4 | 1780 | .127 |
| 5 | — | .133 |
| 6 | 1820 | .135 |
| 7 | 1740 | .139 |
| 8 | 1820 | .139 |
| 9 | 2080 | .010 |
| 10 | 2020 | .010 |

EXAMPLE 2

This example shows the preparation of illustrative organic cation compounds which can be used in the present invention.

(A) In this reaction, 600 ml of dry isopropyl alcohol is charged to a 3 liter round bottom flask under a nitrogen atmosphere. Then 9.52 grs of sodium hydroxide is ground in a mortar and pestle and quickly added to the dry isopropyl alcohol. The isopropyl alcohol is heated to boil under a nitrogen gas blanket until all of the sodium hydroxide is dissolved and the solution is cooled to room temperature. 150 grs of a mixture of dimethyl dihydrogenated tallow ammonium chloride and isopropyl alcohol having an effective molecular weight of 630 grs is dissolved in a beaker with 100 ml of dry isopropyl alcohol and heated to about 60° C.

The quaternary chloride solution is allowed to cool to room temperature at which time it is added to the sodium hydroxide isopropyl alcohol solution. The reaction is mixed for 4 hours at room temperature at which time the precipitated sodium chloride is vacuum filtered out of the system. The dimethyl dihydrogenated tallow ammonium hydroxide-containing filtrate is collected and the excess isopropyl alcohol is distilled off at 45° C. under 18 inches of vacuum.

(B) The same procedure described in (A) is used to prepare benzyl dimethyl hydrogenated tallow ammonium hydroxide.

(C) This reaction is performed by dissolving 105 grams of a mixture of methyl benzyl dihydrogenated tallow ammonium chloride and isopropyl alcohol having an effective molecular weight of 740 grs in 105 grams of isopropyl alcohol containing 15 grams of deionized water. This is done in a 500 ml round bottom flask heated to 40° C. Then 22.12 grams of $Ag_2SO_4$ are added to the flask which is reacted for 2 hours at 40° C. under agitation. After 2 hours at 40° C., the reaction is centrifuged to remove precipitated silver chloride. The supernatant solution is collected and used as the source of methyl benzyl dihydrogenated tallow ammonium sulfate.

(D) This reaction is performed by dissolving a mixture of 92.75 grs of dimethyl dihydrogenated tallow ammonium chloride and isopropyl alcohol having an effective molecular weight of 630 grs in 69.6 grs isopropyl alcohol with heat. The 46.4 grs of deionized water is added and the solution allowed to cool to room temperature. Then 21.0 grs silver carbonate is added and mixed for 2 hours at room temperature. At this point, the sample is centrifuged to remove silver chloride from the solution and the clear supernatant solution is used as the source of dimethyl dihydrogenated tallow ammonium carbonate.

EXAMPLE 3

The example illustrates the preparation of smectite-type clay in hydrogen form using an ion exchange resin.

In this example, 1200 ml of Amberlite 200 cationic exchange resin from Rohm & Haas Co. is placed in a 2 liter capacity ion exchange column. The Amberlite 200 is converted to the hydrogen form by charging the resin with a 10% HCl solution. This is done by preparing 1.5 l of 10% HCl and pumping it into the top of the ion exchange column at a rate of 150 ml/min. The column is then drained and back-washed with deionized water to wash the resin free of excess HCl. This is done until the wash water gives a negative test for chloride using a 1% solution of $AgNO_3$. Then either bentonite clay at about 3% solids or hectorite clay at about 2% solids is pumped into the top of the column at a rate of 150 ml/min. This converts either clay from the sodium form to the hydrogen form.

EXAMPLE 4

This example illustrates the preparation of smectite-type clay in barium form.

One method which may be used to obtain the smectite-type clay in the barium form is by treating the clay which has been previously ion exchanged into the hydrogen form by titrating to a pH of 7.0 with a 0.1 molar solution of $Ba(OH)_2 \cdot H_2O$. With the addition of this solution, the clay flocculates and is filterable. The clay solids are filtered and washed to remove any soluble ions and then diluted back to the original concentration of solids of the starting clay slurry.

EXAMPLE 5

This example illustrates the preparation of an organophilic clay gellant.

The following samples of organophilic clay gellants are prepared in a 3 liter stainless steel reactor equipped with baffles. All reactions are performed at a clay solids content of 1.0% by weight by first charging the Manton Gaulin sheared (4000 psi) bentonite clay slurry either in the hydrogen form (at 2.43% solids) or in the sodium form (at 2.54% solids) to the reactor. The clay slurry is diluted with the amount of deionized water listed below and heated to 65° C. A cation-anion pair is prepared separately in a glass beaker. This is done by dissolving 113 milliequivalents of the cation dissolved in isopropyl alcohol (IPA) with 24 milliequivalents of the anion in water (both amounts being per 100 grams of clay solids, 100% active basis) and heating the mixture until a clear solution is obtained. The temperature of the cation-anion pair in solution is adjusted to 65° C. and then added to the diluted clay slurry.

| Reactants | Bentonite Clay Slurry | Deionized Water Clay Dilution | Cation-IPA Mixture | Anion | Deionized Water Cation/Anion |
|---|---|---|---|---|---|
| $Na^+$ Clay + [B2MHT]$^+$Cl$^-$/Na Stearate | 590.5 grs | 710 ml | 9.10 grs | 1.10 grs | 200 ml |
| $H^+$ Clay + [B2MHT]$^+$OH$^-$/ Stearic Acid | 617.3 grs | 683 ml | 11.91 grs | 1.02 grs | 200 ml |

[B2MHT] is benzyl dimethyl hydrogenated tallow ammonium.

The reaction is continued for 30 minutes at 65° C. at which time it is vacuum filtered. These samples are not repulped. Both samples are dried at 40° C. in a forced air oven and milled in a centrifugal mill without a screen. These samples are tested as a direct add and as a premix polyester additive in a standard Reichhold resin which is a 56% solids/44% styrene unsaturated polyester resin prepared from an unsaturated polyester formulation comprising 68% resin solids (Reichhold 31-001, a commercial product from Reichhold Chemicals) and 32% styrene. The samples are added to the resin and let-down with styrene in an amount to provide a 1% concentration of the organophilic clay gellant in the fluid mixture. The dispersion is accomplished using a Cowles Disperator (2,000 linear feet per minute) for 15 minutes.

| Reactants | LOI | Brookfield Viscosity 6 rpm/60 rpm | T.I. |
|---|---|---|---|
| $Na^+$ Clay + [B2MHT]$^+$Cl$^-$/Na Stearate | 39.2% | 2000 cPs/642 cPs | 3.1 |
| $H^+$ Clay + [B2MHT]$^+$OH$^-$/ Stearic Acid | 39.5% | 2280 cPs/692 cPs | 3.3 |

In the foregoing Table, viscosity data for the resin system were determined using a Brookfield LVT viscometer using a No. 3 spindle at 25° C. ($\pm 1°$ C.) at 6 rpm after 3 minutes or 60 rpm after 30 seconds and are set forth below. The thixotropic index (T.I.) is a ratio of the viscosities taken at 6 and 60 rpm. LOI refers to loss on ignition, as disclosed in U.S. Pat. No. 4,240,951, and indicates the level of organic material retained on the smectite-type clay after reaction with the organic cation and organic anion, if present. To determine LOI, a dry sample of the organophilic clay is weighed, heated to about 1000° C., reweighed and the loss in weight is calculated as a percentage of the original dry weight.

Additional samples of the organophilic clay gellant are prepared according to the foregoing procedure and are loaded at a quantity of 6.0 grs to 108.18 grs of styrene monomer in a mixing container and stirred for 15 minutes at 1200 rpm with a laboratory Lightnin mixer fitted with a 2 inch diameter three-blade propeller. 485.82 grs of an unsaturated polyester formulation comprising 68.49% resin solids (Reichhold 31-001, a commercial product from Reichhold Chemicals) and 31.51% styrene is added to the mix along with 1.2 grs of 12% cobalt octoate and stirring continued for an additional 10 minutes. This provides a final concentration of 1% by weight of the organophilic clay gellant in the fluid mixture. Viscosity data are determined with a Brookfield LVT viscometer using a No. 3 spindle and are set forth below.

| Reaction Conditions | LOI (by weight) | Direct Add Brookfield Viscosity | | Premix Brookfield Viscosity | |
|---|---|---|---|---|---|
| | | 6 rpm/60 rpm | T.I. | 6 rpm/60 rpm | T.I. |
| 30 mins @ 65° C. (Control) | 41.4% | 1580 cPs/566 cPs | 2.8 | 3420 cPs/982 cPs | 3.5 |
| 30 mins @ 55° C. | 41.7% | 1220 cPs/490 cPs | 2.5 | 3460 cPs/968 cPs | 3.6 |
| 60 mins @ 55° C. | 41.7% | 1380 cPs/510 cPs | 2.7 | 3580 cPs/988 cPs | 3.6 |
| 30 mins @ 45° C. | 41.9% | 1140 cPs/464 cPs | 2.5 | 3420 cPs/1006 cPs | 3.4 |
| 60 mins @ 45° C. | 41.9% | 1180 cPs/460 cPs | 2.6 | 3720 cPs/1022 cPs | 3.6 |
| 30 mins @ 35° C. | 41.9% | 840 cPs/388 cPs | 2.2 | 3680 cPs/1020 cPs | 3.6 |
| 60 mins @ 35° C. | 41.9% | 880 cPs/388 cPs | 2.3 | 3480 cPs/990 cPs | 3.5 |

| Reactants | LOI | Brookfield Viscosity 6 rpm/60 rpm | T.I. |
|---|---|---|---|
| $Na^+$ Clay + [B2MHT]$^+$CL$^-$/Na Stearate | 39.3% | 3160 cPs/920 cPs | 3.4 |
| $H^+$ Clay + [B2MHT]$^+$OH$^-$/Stearic Acid | 39.3% | 3420 cPs/982 cPs | 3.5 |

EXAMPLE 6

This examples illustrates the effect of reaction time and temperature on the organophilic clay gellant.

Into a 3 liter stainless steel reactor equipped with baffles is placed 823 grs of Manton Gaulin sheared (4000 psi) bentonite clay in the hydrogen form (at 2.43% solids) and diluted with 927 ml of deionized water. Four different reactions are run in which the reaction temperature employed are 65° C., 55° C., 45° C. and 35° C. The cation-anion pair for each reaction is prepared by dissolving 21.84 grs of a mixture of benzyl dimethyl hydrogenated tallow ammonium hydroxide and isopropyl alcohol having an effective molecular weight of 965 grs (113 me of the ammonium cation per 100 grams of clay solids, 100 active basis) plus 1.36 grs stearic acid (24 me per 100 grams of clay solids, 100% active basis) in 250 ml deionized water in a beaker. This is done by heating the mixture until a clear solution is obtained, then adjusting the temperature of each respective sample to either 65° C., 55° C., 45° C. or 35° C. The cation-anion solution is then slowly added to the clay slurry and reacted for 30 minutes at each respective temperature. After 30 minutes, approximately half the contents of the reactor is removed, filtered and dried at 40° C. in a forced air oven. The material remaining in the reactor is left for an additional 30 minutes at each respective temperature. The organophilic clay is then filtered and dried at 40° C. in a forced air oven. All dried samples are milled in a centrifugal mill without a screen. Each sample is then treated as a direct add and premix additive in the previously described polyester resin with the viscosity data set forth below.

This example illustrates that when the organophilic clay gellant is prepared without forming an electrolyte as a by-product, a lower reaction temperature can be used without sacrificing efficiency if the organophilic clay gellant is incorporated into a polyester composition via a premix.

EXAMPLE 7

The following samples are prepared in a 3 liter stainless steel reactor equipped with baffles. All reactions are performed at a clay solids content of 2.80% by weight by first charging the bentonite clay slurry (either in the hydrogen form or sodium form) to the reactor followed by the deionized water charge. The diluted clay slurry is then heated to 65° C. where the corresponding cation (heated to 65° C.), is added to the reactor.

| Reactants | Bentonite Clay Slurry | Deionized Water | Cation-IPA Mixture | LOI (by weight) |
|---|---|---|---|---|
| 1 $H^+$Clay + [MB2HT]$^+$OH$^-$ | 970.9 grs (3.09% solids) | 100 mls | 37.32 grs | 46.8% |
| 2 $H^+$Clay + [MB2HT]$^+$Cl$^-$ | 970.9 grs (3.09% solids) | 100 mls | 24.66 grs | 46.8% |
| 3 $Na^+$Clay + [MB2HT]$^+$Cl$^-$ | 937.5 grs (3.20% solids) | 134 ml | 24.66 grs | 46.4% |
| 4 $Ba^{+2}$Clay + [MB2HT]$_2^+$SO$_4^=$ | 970.9 grs (3.09% solids) | 100 ml | 51.86 grs | 44.8% |
| 5 $Na^+$Clay + [MB2HT]$^+$Cl$^-$ + BaSO$_4$ | 937.5 grs (3.20% solids) | 134 ml | 24.66 grs | 45.0% |

[MB2HT] is methyl benzyl dihydrogenated tallow ammonium.

The reaction is continued for 30 minutes at 65° C. at which time it is vacuum filtered and repulped. The repulping step is carried out in the same 3 liter stainless steel reactor with 1.5 liters of tap water heated to 40° C. for 30 minutes. In performing the repulping step for sample No. 5 above, 3.53 grs of BaSO$_4$ is added to the organophilic clay slurry. This amount of BaSO$_4$ represents an equal molar amount of that produced as a by-product in reaction No. 4 above. The organophilic clay samples are filtered and dried at 60° C. in a forced air oven. All samples are milled in a centrifugal mill using a 0.5 mm screen.

Polyester pregel samples are prepared by making an 8% solids mixture of samples of the foregoing organophilic clay in styrene. This is done by adding 48 grs of the organophilic clay to 552 grs of styrene monomer and dispersing it for 15 minutes at 4400 rpm (2000 lfpm) using a laboratory Cowles CV disperator.

Pregel letdown is accomplished by adding 75 grs of the above mentioned 8% pregel to 489.2 grs of 68% resin solids of Reichhold 31-001 polyester resin. An additional 35.8 grs of styrene monomer is added at this point which will yield a 1% loading of the organophiic clay in a 56% resin solids/44% styrene base. 1.2 grs of a 12% solution of cobalt octoate promoter is added and the entire mixture blended using a laboratory Lightnin mixer equipped with a 2 inch diameter three blade propeller at 1000 rpm for 10 minutes.

Viscosity data for the resin system are determined using a Brookfield LVT viscometer after equilbrating at 25° C. (±1° C.). Viscosity measurements are made using a No. 3 spindle at 6 rpm after 3 minutes and 60 rpm after 30 seconds and is set forth below. The thixotropic index (T.I.) is the ratio of the viscosities taken at 6 rpm and 60 rpm.

| Reactants | Brookfield Viscosity 6 rpm/60 rpm | T.I. |
|---|---|---|
| (1) $H^+$Clay + [MB2HT]$^+$OH$^-$ | 1440 cP/510 cP | 2.8 |
| (2) $H^+$Clay + [MB2HT]$^+$Cl$^-$ | 1330 cP/490 cP | 2.7 |
| (3) $Na^+$Clay + [MB2HT]$^+$Cl$^-$ | 1300 cP/482 cP | 2.7 |
| (4) $Ba^{+2}$Clay + [MB2HT]$^+$SO$_4$= | 1220 cP/466 cP | 2.6 |
| (5) $Na^+$Clay + [MB2HT]$^+$CL + $BaSO_4$ | 840 cP/374 cP | 2.2 |

EXAMPLE 8

The following organophilic clay samples are prepared in a 3 liter stainless steel reactor equipped with baffles. All reactions are performed at a clay solids content of 1.5% by weight by first charging the hectorite clay slurry (either hydrogen form or sodium form) to the reactor followed by the deionized water dilution. The diluted clay slurry is then heated to 65° C. where the corresponding cation also heated to 65° C. is added to the reactor.

| Reactants | Hectorite Clay Slurry | Deionized Water | Cation-IPA Mixture | LOI (by weight) |
|---|---|---|---|---|
| $H^+$Clay + [2M2HT]$^+$OH$^-$ | 1058.2 grs (1.89% solids) | 275 ml | 22.28 grs | 39.8% |
| $H^+$Clay + [2M2HT]$_2$+CO$_3$= | 1058.2 grs (1.89% solids) | 275 ml | 30.0 grs | 40.2% |
| $H^+$Clay + [2M2HT]$^+$Cl | 1058.2 grs (1.89% solids) | 275 ml | 12.16 grs | 40.4% |
| $Na^+$Clay + [2M2HT]$^+$OH$^-$ | 627.0 grs (3.19% solids) | 706 ml | 22.28 grs | 39.7% |
| $Na^+$Clay + [2M2HT]$_2$+CO$_3$= | 627.0 grs (3.19% solids) | 706 ml | 30.0 grs | 40.3% |
| $Na^+$Clay + [2M2HT]$^+$Cl | 627.0 grs (3.19% solids) | 706 ml | 12.16 grs | 40.4% |

[2M2HT] is dimethyl dihydrogenated tallow ammonium.

The reaction is continued for 30 minutes at 65° C. at which time it is vacuum filtered and repulped. The repulping step is carried out in the same 3 liter stainless steel reactor with 1.5 liters of tap water heated at 40° C. for 30 minutes. The organophilic clay samples are filtered and dried at 60° C. in a forced air oven. All samples are milled in a centrifugal mill using a 0.5 mm screen.

Samples of the organophilic clay gellants are incorporated into a master alkyd semi-gloss enamel having the following formulation and the properties are determined.

| Trade Name Material | Generic Name | Manufacturer | % By Wt. | lbs. | Gals. |
|---|---|---|---|---|---|
| Aroplaz 1266M.70 | Long Oil Alkyd | SRK | 14.64 | 158.80 | 19.85 |
| Amsco 66/3 | Mineral Spirits | Amsco | 6.42 | 69.43 | 10.64 |
| | Mix 3 Minutes @ 1000 rpm | | | | |
| | Organophilic Clay Gellant | NL | 0.55 | 6.0 | 0.49 |
| | Mix 5 Minutes @ 3000 rpm | | | | |
| Methanol - 95% | Methanol/Water (95/5%) | | 0.16 | 1.80 | 0.27 |
| | Mix 3 Minutes @ 2000 rpm | | | | |
| Titanox 2101 | TiO$_2$ | NL | 26.28 | 285.00 | 8.55 |
| GamaSperse 80 | CaCo$_3$ | Georgia Marble | 14.30 | 155.00 | 6.87 |
| ON COWLES DISPERATOR @ 5400 rpm for 15 minutes | | | | | |
| Let Down % (Mix at 2000 rpm for 15 minutes) | | | | | |
| Aroplaz 1266M70 | L.O. Alkyd | S&K | 29.07 | 315.30 | 39.41 |
| Amsco 66/3 | M.S. | Amsco | 7.66 | 83.10 | 12.69 |
| 6% Cobalt Drier | Co. Naphthanate | Nuodex | 0.20 | 2.30 | 0.31 |
| 6% Zr. Drier | Zr. Naphthanate | Nuodex | 0.56 | 6.10 | 0.85 |
| Exkin #2 | Methyl Ethyl Ketoxine | Nuodex | 0.14 | 1.50 | 0.19 |
| | | | 100.00 | 1084.6 | 100.12 |

PVC = .29% Solids (Volume) = 53.4% wt/gal = 10.83.

The paint formulation is equilibrated for 24 hours at 25° C. after preparation and then measured for viscosity using a RVT Brookfield viscometer equipped with a No. 2 spindle at 10 rpm. Fineness of grind was determined according to ASTM Method D1210-79 entitled "Fineness of Dispersion of Pigment-Vehicle Systems." The results are set forth in the following table.

| Reactants | FOG | Stormer KU | Brookfield Vis. 10 rpm/100 rpm | T.I. | ICI | Saq |
|---|---|---|---|---|---|---|
| H+Clay + [2M2HT]OH− | 6.5A | 92 | 2660 cP/1600 cP | 1.66 | 4.4 | 8 |
| H+Clay + [2M2HT]+$_2$CO$_3$= | 6.5A | 91 | 2660 cP/1620 cP | 1.64 | 4.6 | 8 |
| H+Clay + [2M2HT]+Cl− | 6.5A | 89 | 2340 cP/1440 cP | 1.63 | 4.5 | 7 |
| Na+Clay + [2M2HT]+OH− | 6.5A | 89 | 2200 cP/1400 cP | 1.57 | 4.4 | 7 |
| Na+Clay + [2M2HT]+$_2$CO$_3$= | 6.5A | 89 | 2180 cP/1390 cP | 1.57 | 4.4 | 7 |
| Na+Clay + [2M2HT]+Cl− | 6.5A | 89 | 2400 cP/1440 cP | 1.67 | 4.4 | 7 |

The invention being thus described, it will be obvious that the same may be varied in many ways. Such variations are not to be regarded as a departure from the spirit and scope of the invention and all such modifications are intended to be included within the scope of the following claims.

We claim:

1. An organophilic clay gellant comprising the reaction product of a smectite-type clay having a cation associated therewith and having a cation exchange capacity of at least about 75 milliequivalents per 100 grams of said clay and an organic cation derived from an organic cation/anion compound having the general formula:

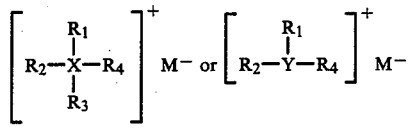

or mixtures thereof wherein X is a nitrogen or phosphorus, Y is sulfur, $M^-$ is an anion, $R_1$ is a lineal or branched, saturated or unsaturated alkyl group having 12 to 22 carbon atoms and $R_2$, $R_3$ and $R_4$ are independently selected from (a) lineal or branched alkyl group having 1 to 22 carbon atoms; (b) aralkyl groups which are benzyl and substituted benzyl moities including fused ring moieties having lineal or branched 1 to 22 carbon atoms in the alkyl portion of the structure; (c) aryl groups including phenyl and substituted phenyl including fused ring aromatic substituents; (d) data, gamma, unsaturated groups having six or less carbon atoms or hydroxyalkyl groups having 2 to 6 carbon atoms; and (e) hydrogen and wherein the improvement comprises the reaction product of the cation from the smectite-type clay and $M^-$ is water, a gas, an insoluble compound having a solubility constant of $1 \times 10^{-2}$ or less in water at room temperature or a mixture thereof.

2. The organophilic clay gellant of claim 1 wherein the reaction product of the cation from the smectite-type clay and $M^-$ is water.

3. The organophilic clay gellant of claim 1 wherein the reaction product of the cation from the smectite-type clay and $M^-$ is a gas.

4. The organophilic clay gellant of claim 3 wherein the cation from the smectite-type clay is $H^+$, $M^-$ is carbonate and the gas comprises carbon dioxide.

5. The organophilic clay gellant of claim 1 the reaction product of the cation from the smectite-type clay and $M^-$ is an insoluble compound.

6. The organophilic clay gellant of claim 5 wherein the insoluble compound is selected from barium sulfate, calcium sulfate, calcium phosphite, calcium phosphate, lead phosphate, magnesium carbonate, barium carbonate, calcium carbonate, barium fluoride, calcium fluoride and mixtures thereof.

7. The organophilic clay gellant of claim 6 wherein the insoluble compound is barium sulfate, calcium sulfate or mixtures thereof.

8. The organophilic clay gellant of claim 6 wherein the insoluble compound is magnesium carbonate, barium carbonate, calcium carbonate or a mixture thereof.

9. The organophilic clay gellant of claim 1 wherein an organic anion derived from an additional compound having a pKa less than about 11.0, is reacted with said organic cation and said smectite-type clay, said organic anion originally being paired with a cation which reacts with $M^-$ to form water, a gas, an insoluble compound or a mixture thereof.

10. The organophilic clay gellant of claim 9 wherein the milliequivalent ratio of the organic cation to the organic anion is in the range of from about 1.7 : 1.0 to about 28 : 10.

11. The organophilic clay gellant of claim 9 wherein the organic anion is derived from carboxylic acid, sulfonic acid, alkyl sulfate or a mixture thereof.

12. The organophilic clay gellant of claim 11 wherein the organic anion is selected from stearate, lauryl sulfate, and mixtures thereof.

13. The organophilic clay gellant of claim 1 wherein the organic anion is lauryl sulfate.

14. The organophilic clay gellant of claim 12 wherein the organic anion is stearate.

15. The organophilic clay gellant of claim 1 wherein the smectite-type clay is bentonite, hectorite or a mixture thereof.

16. The organophilic clay gellant of claim 1 wherein the amount of organic cation is from about 90 to about 150 percent of the cation exchange capacity of the clay.

17. A process for preparing an organophilic clay gellant comprising:
(a) preparing a slurry of smectite-type clay having a cation associated therewith and having a cation exchange capacity of at least 75 milliequivalents per 100 grams of clay; and
(b) reacting the smectite-type clay with organic cation in an amount ranging from about 90 to about 150 percent of the cation exchange capacity of the clay, said organic cation being derived from an organic cation/anion compound having the general formula:

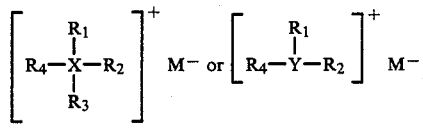

or mixtures thereof thereby forming an organophilic clay gellant wherein X is a nitrogen or phosphorus, Y is sulfur, $M^-$ is an anion, $R_1$ is a lineal or branched, saturated or unsaturated alkyl group having 12 to 22 carbon atoms and $R_2$, $R_3$ and $R_4$ are independently selected from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups including phenyl and substituted phenyl including fused ring aromatic substituents; (d) beta, gamma, unsaturated groups having six or less carbon atoms or hydroxyalkyl groups having 2 to 6 carbon atoms; and (3) hydrogen and wherein the improvement comprises the reaction product of the cation from the smectite-type clay and $M^-$ is water, a gas, an insoluble compound having a solubility constant of $1 \times 10^{-2}$ or less in water at room temperature or a mixture thereof.

18. The process of claim 17 wherein the reaction product of the cation from the smectite-type clay and $M^-$ is water.

19. The process of claim 17 wherein the reaction product of the cation from the smectite-type clay and $M^-$ is a gas.

20. The process of claim 19 wherein the cation from the smectite-type claim is $H^+$, $M^-$ is carbonate and the gas comprises carbon dioxide.

21. The process of claim 17 wherein the reaction product of the cation form the smectite-type clay and $M^-$ is an insoluble compound.

22. The organophilic clay gellant of claim 21 wherein the insoluble compound is selected from barium sulfate, calcium sulfate, calcium phosphite, calcium phosphate, lead phosphate, magnesium carbonate, barium carbonate, calcium carbonate, barium fluoride, calcium fluoride and mixtures thereof.

23. The process of claim 22 wherein the insoluble compound is barium sulfate, calcium sulfate or a mixture thereof.

24. The process of claim 17 wherein the slurry of the smectite-type clay is prepared by dispersing smectite-type clay having sodium ions on the cation exchange sites of the clay into a liquid medium and passing the dispersion through a cation exchange resin in hydrogen form wherein the smectite-type clay has hydrogen on the exchange sites.

25. The process of claim 24 wherein $M^-$ is hydroxyl and the reaction product is water.

26. The process of claim 17 wherein the organophilic clay gellant is separated from the slurry and the resulting liquid is recycled and used in the preparation of further smectite-type clay slurry in the substantial absence of treatment of the liquid to remove ions therefrom.

27. The process of claim 17 wherein the organophilic clay gellant is separated from the slurry and dried such that the temperature of the wet organophilic clay does not exceed about 50° C.

28. The process of claim 17 wherein the organophilic clay gellant is separated from the slurry and dried in the substantial absence of washing.

29. The process of claim 17 wherein the slurry of smectite-type clay is subjected to high shear conditions whereby clay agglomerates are separated prior to reacting the slurry with the organic cation.

30. The process of claim 17 wherein an organic anion derived from an additional compound having a pKa less than about 11.0 is reacted with the smectite-type clay and the organic cation, said organic anion being present in amount such that the milliequivalent ratio of the organic cation to the organic anion is in the range of from about 1.7:1.0 to about 28:1.0.

31. The process of claim 30 wherein the organic anion is derived from carboxylic acid, sulfonic acid, alkyl sulfate or a mixture thereof.

32. The process of claim 31 wherein the organic anion is selected from stearate, lauryl sulfate and mixtures thereof.

* * * * *

UNITED STATES PATENT AND TRADEMARK OFFICE
CERTIFICATE OF CORRECTION

PATENT NO.  : 4,894,182
DATED       : January 16, 1990
INVENTOR(S) : Cody et al

It is certified that error appears in the above-identified patent and that said Letters Patent is hereby corrected as shown below:

Column 23:

In claim 1, line 37, amend "group" to --groups--;

line 43, amend "data" to --beta--.

Column 24:

In claim 13, line 1, amend "1" to --12--.

In claim 17, line 60, amend the formula to read:

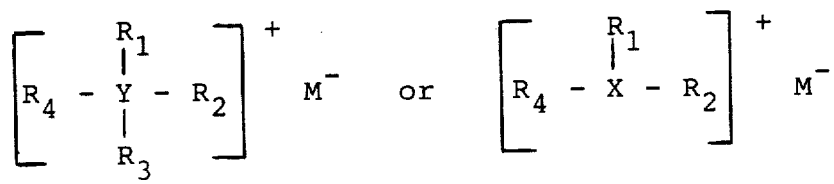

Signed and Sealed this

Fourth Day of February, 1992

Attest:

HARRY F. MANBECK, JR.

*Attesting Officer*  *Commissioner of Patents and Trademarks*